(12) United States Patent
Takewaki et al.

(10) Patent No.: US 10,222,244 B2
(45) Date of Patent: Mar. 5, 2019

(54) DISPLAY DEVICE FOR OUTBOARD MOTOR

(71) Applicant: SUZUKI MOTOR CORPORATION, Hamamatsu-shi, Shizuoka (JP)

(72) Inventors: Hiromichi Takewaki, Hamamatsu (JP); Toshiya Kataoka, Hamamatsu (JP); Yuki Nakaaki, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 15/861,100

(22) Filed: Jan. 3, 2018

(65) Prior Publication Data

US 2018/0209825 A1    Jul. 26, 2018

(30) Foreign Application Priority Data

Jan. 25, 2017   (JP) ................................ 2017-011245

(51) Int. Cl.
| | |
|---|---|
| *B63H 25/42* | (2006.01) |
| *G01D 7/00* | (2006.01) |
| *B63H 20/00* | (2006.01) |
| *G01D 7/02* | (2006.01) |
| *B25H 1/00* | (2006.01) |
| *G07C 5/08* | (2006.01) |
| *G09G 3/04* | (2006.01) |

(52) U.S. Cl.
CPC ........... *G01D 7/002* (2013.01); *B25H 1/0007* (2013.01); *B63H 20/001* (2013.01); *B63H 25/42* (2013.01); *G01D 7/02* (2013.01); *G07C 5/0825* (2013.01); *G09G 3/04* (2013.01); *B63H 2020/003* (2013.01)

(58) Field of Classification Search
CPC .............................. B63H 25/42; G01D 7/002
See application file for complete search history.

(56) References Cited

U.S. PATENT DOCUMENTS

| | | | |
|---|---|---|---|
| 2006/0054067 A1* | 3/2006 | Hoberman | B63H 25/44 114/145 R |
| 2008/0233812 A1* | 9/2008 | Kawanishi | B63H 20/10 440/1 |
| 2013/0173138 A1* | 7/2013 | Vasichek | F02D 41/2422 701/102 |

FOREIGN PATENT DOCUMENTS

JP          4670515 B2      4/2011

* cited by examiner

*Primary Examiner* — Stephen P Avila
(74) *Attorney, Agent, or Firm* — Troutman Sanders LLP

(57) ABSTRACT

A display device for an outboard motor includes a storage device storing unique information of the outboard motor. The display device for the outboard motor has a gauge mode and a service tool mode as display modes. By mounting the display device for the outboard motor to a specific boat, both an operating state of the outboard motor and the unique information of the outboard motor are displayable in the gauge mode. Only the unique information of the outboard motor is displayable in the service tool mode. The display modes are configured to be switched between the gauge mode and the service tool mode.

2 Claims, 5 Drawing Sheets

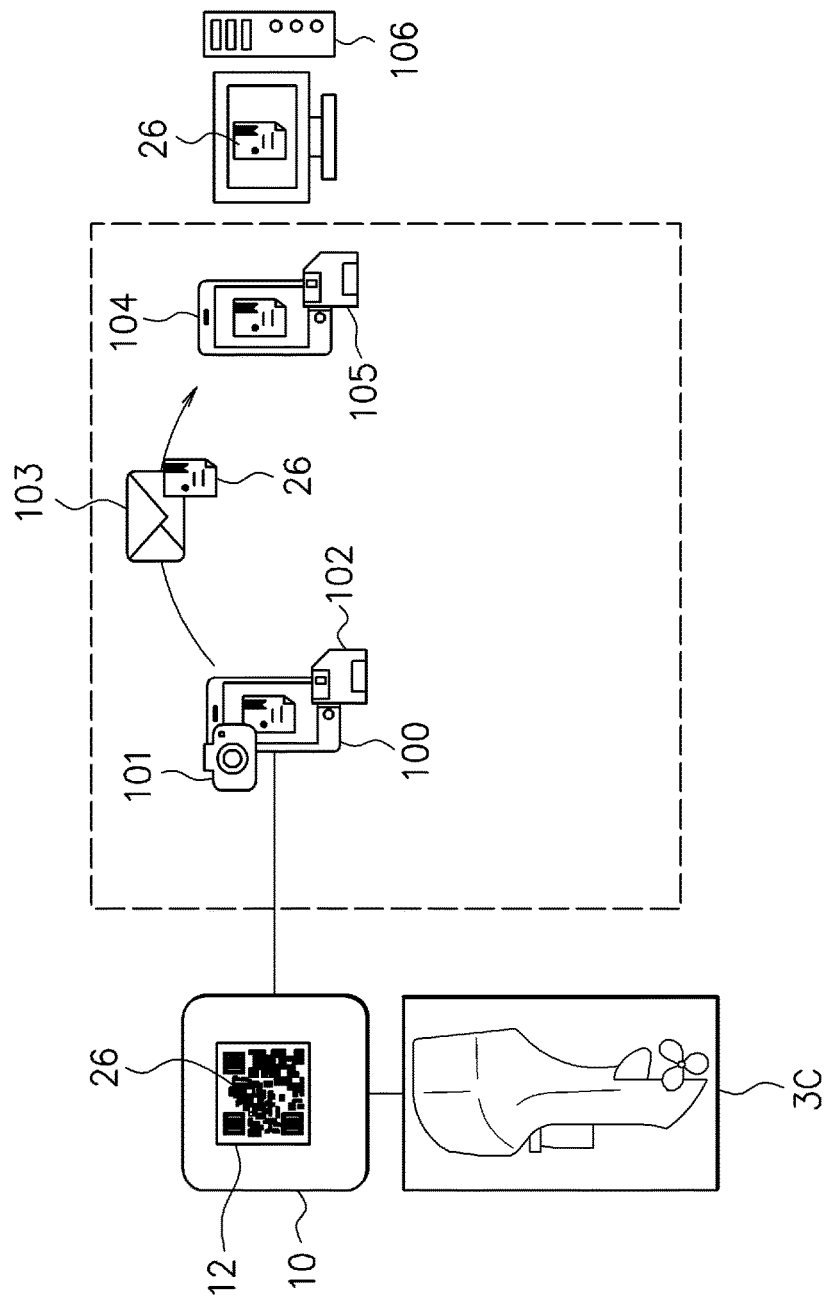

DISPLAY DEVICE FOR OUTBOARD MOTOR

CROSS-REFERENCE TO RELATED APPLICATIONS

This application is based upon and claims the benefit of priority of the prior Japanese Patent Application No. 2017-011245, filed on Jan. 25, 2017, the entire contents of which are incorporated herein by reference.

BACKGROUND OF THE INVENTION

Field of the Invention

The present invention relates to a display device that doubles as a service tool function for, for example, repair and inspection in an outboard motor.

Description of the Related Art

For example, Patent Document 1 discloses a vehicle information recognition system that can recognize information on a vehicle regardless of a current position of the vehicle. If a failure diagnosis device detects a failure, this system creates a multidimensional barcode representing contents of the failure and an address of a repair manual database server and causes a display device to display this multidimensional barcode together with a failure part code indicative of the failure part. When a driver reads the multidimensional barcode displayed in the display device using a mobile phone, the mobile phone extracts the contents of the failure and the address of the repair manual database server from the multidimensional barcode and displays the extracted information in a screen of the mobile phone. Accessing the repair manual database server by the mobile phone using the address displayed in the screen of the mobile phone makes browse and download of a repair guidance for the failure possible.
Patent Document 1: Japanese Patent No. 4670515

The display device according to Patent Document 1 is only for the vehicle that includes the display device, that is, the display device does not have a usage method other than the usage by being mounted to the vehicle; therefore, its usability or functionality is limited.

SUMMARY OF THE INVENTION

The present invention has been made in consideration of such circumstances, and the object is to provide a display device for an outboard motor that achieves excellent usability, functionality, and a similar feature.

A display device for an outboard motor according to the present invention in which a multidimensional code representing an operating state of the outboard motor and unique information of the outboard motor is displayable includes a storage device storing the unique information of the outboard motor. The display device for the outboard motor has a gauge mode and a service tool mode as display modes. By mounting the display device for the outboard motor to a specific boat, both the operating state of the outboard motor and the unique information of the outboard motor are displayable in the gauge mode. Only the unique information of the outboard motor is displayable in the service tool mode. The display modes are configured to be switched between the gauge mode and the service tool mode.

BRIEF DESCRIPTION OF THE DRAWINGS

FIG. 6 is a diagram schematically illustrating a usage example of the display device according to the present invention.

DETAILED DESCRIPTION OF THE PREFERRED EMBODIMENTS

The following describes embodiments of a display device for an outboard motor according to the present invention with reference to the attached drawings.

A display device for an outboard motor according to one embodiment of the present invention in which a multidimensional code representing an operating state of the outboard motor and unique information of the outboard motor is displayable includes a storage device storing the unique information of the outboard motor. The display device for the outboard motor has a gauge mode and a service tool mode as display modes. By mounting the display device for the outboard motor to a specific boat, both the operating state of the outboard motor and the unique information of the outboard motor are displayable in the gauge mode. Only the unique information of the outboard motor is displayable in the service tool mode. The display modes are configured to be switched between the gauge mode and the service tool mode.

With the display device for the outboard motor of the present invention, in addition to achieving an original gauge function, the display device can be used in the service tool mode. In this case, storing the information unique to the outboard motor eliminates the need for an initial setting when the service tool mode is returned to the gauge mode.

Embodiments

Figure 1:
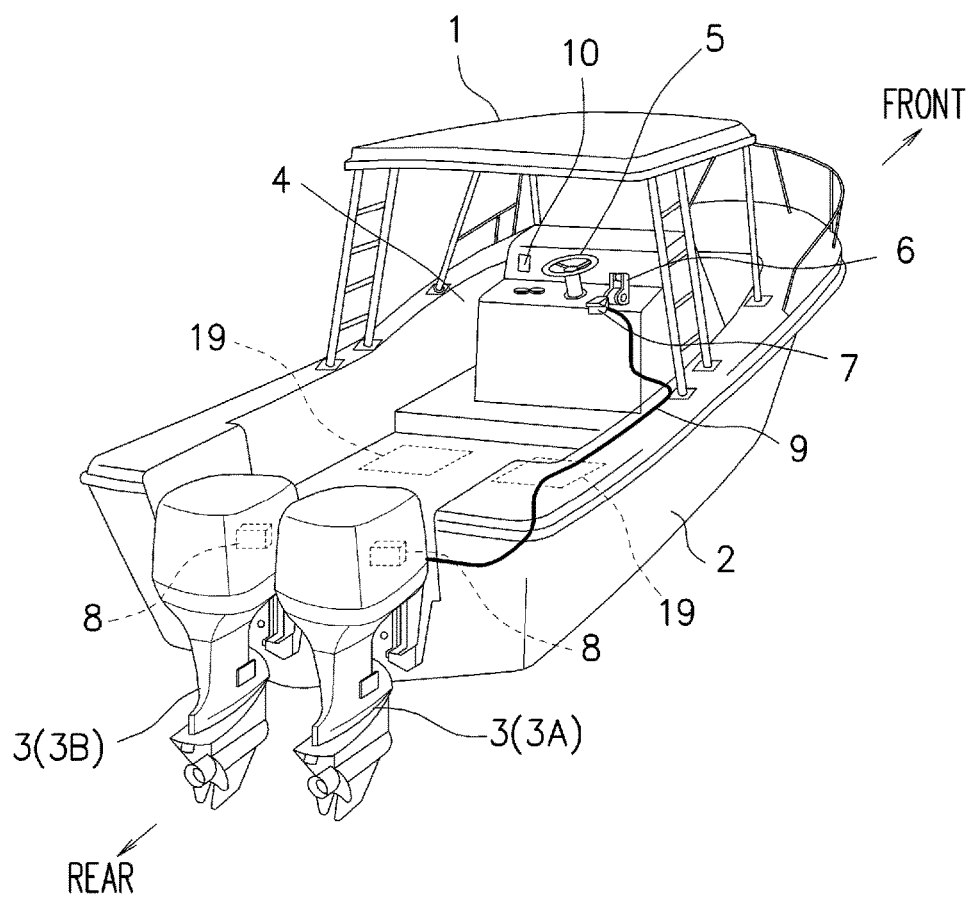
FIG. 1 is a perspective view viewing a boat as an application example of a display device of the present invention from obliquely rearward.

FIG. 1 is a perspective view viewing a boat 1 as an application example of the present invention from obliquely rearward. First, the following describes an outline of an overall configuration of the boat 1 with reference to FIG. 1. Including FIG. 1, the drawings used in the following description each display a front, a rear, or a right-left direction of the vehicle by arrows as necessary.

As illustrated in FIG. 1, a plurality of outboard motors 3 (here, two outboard motors 3A and 3B) to which respective engines are mounted are mounted to transoms, which are positioned at the rear of a boat body 2 of the boat 1, via bracket devices.

A boat navigation room 4 is disposed at the front side of the boat body 2. This boat navigation room 4 includes a steering handle 5, a remote control lever 6, an ignition switch 7, and a similar member. Meanwhile, the outboard motors 3 include Engine Control Modules 8 (ECMs), and the ignition switch 7 and a similar member are coupled to the ECMs 8 of the outboard motors 3 (outboard motors 3A and 3B) via a communication line 9.

After an operation of turning on the ignition switch 7, a boat operator operates the steering handle 5 and the remote control lever 6 to ensure navigating the boat 1. Then, electrically controlling the outboard motors 3A and 3B based on operation information by the steering handle 5 and the remote control lever 6 ensures changing, for example, a shift, a throttle, and a steering of the outboard motors 3A and 3B.

Here, the boat navigation room 4 includes a display device 10 at a position where the boat operator can visually perceive the display device 10 for operation, for example, obliquely forward of the steering handle 5 as illustrated in FIG. 1.

Figure 2:
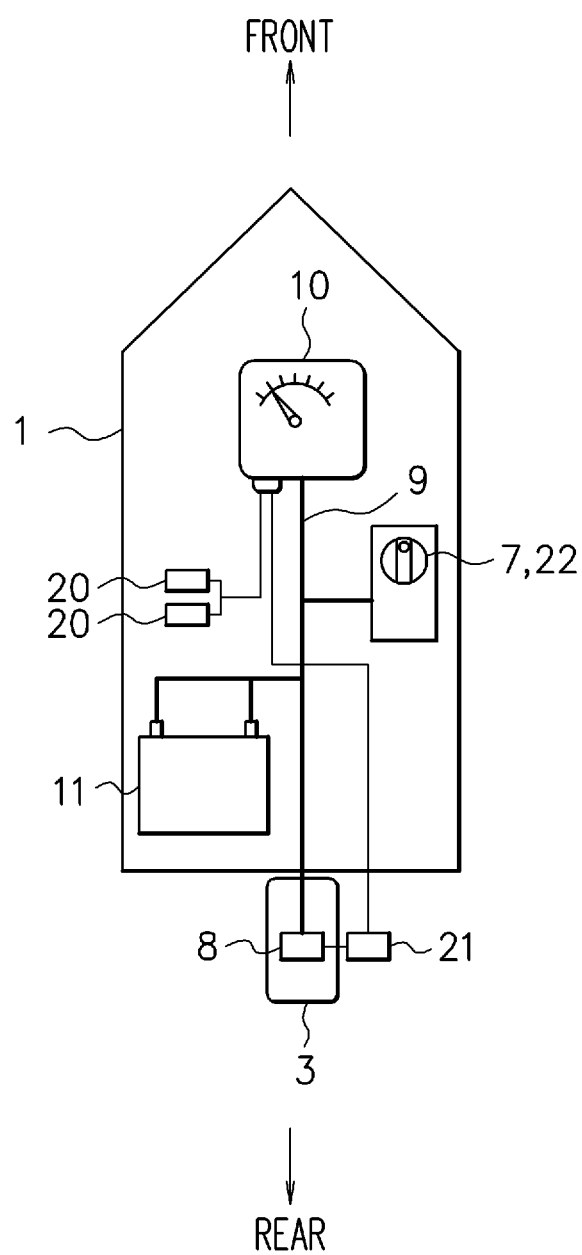
FIG. 2 is a diagram schematically illustrating a coupling relationship between an outboard motor and the display device and a similar member of the boat according to the embodiment of the present invention.

The display device 10 is constituted as a multifunctional display device and can display a multidimensional code representing operating states of the outboard motors 3 and unique information of the outboard motors 3. The selection by the boat operator can appropriately display necessary information. As illustrated in FIG. 2, the display device 10 is also coupled to a controller and ECM 8 of the outboard motor 3 via the communication line 9 to ensure obtaining the information on the operating state of the outboard motor 3 and similar information. The display device 10 is basically attachably/detachably coupled for each of the outboard motors 3. As illustrated in FIG. 2, the boat 1 includes a battery 11 coupled to the display devices 10 or a similar device as a power source to drive the display devices 10 and a similar member. While FIG. 2 illustrates the one outboard motor 3, the respective outboard motors 3A and 3B illustrated in FIG. 1 may be coupled similar to the case of FIG. 2.

As display modes, the display device 10 has a gauge mode, which can display both the operating state of the outboard motor 3 mounted to and equipped with the specific boat 1 and the unique information of the boat 1, and a service tool mode, which can display only the unique information of the outboard motor 3; and can switch the display mode between the gauge mode and the service tool mode.

Figure 3:
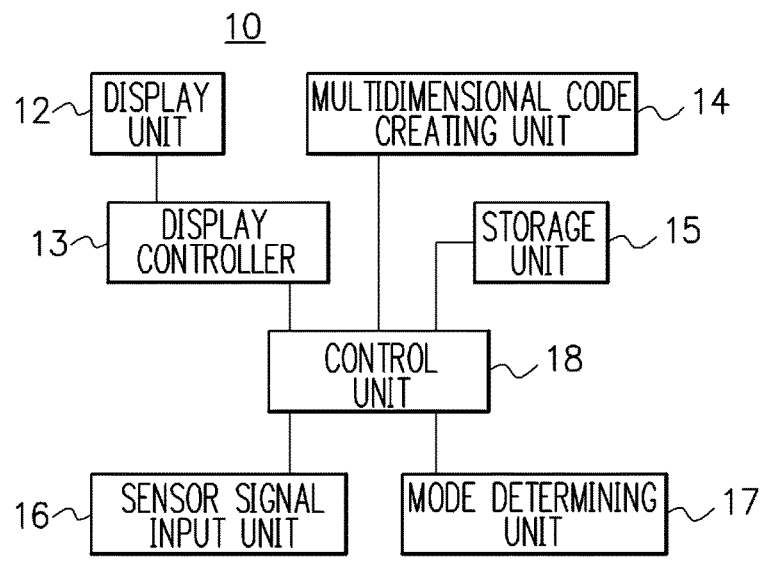
FIG. 3 is a block diagram illustrating a schematic configuration example of the display device according to the present invention.

With reference to FIG. 3 for a specific configuration of the display device 10, the display device 10 includes a display unit 12, which displays various information contents on the operating state and the unique information of the outboard motor 3 and similar information in a liquid crystal display screen, and a display controller 13, which switches the display modes of the display unit 12 and performs control so as to display predetermined display contents for each display mode. While the gauge mode and the service tool mode of the display device 10 can be manually switched, the gauge mode and the service tool mode can also be automatically switched. The single display device 10 can appropriately display an engine speed, a running speed, a fuel consumption, a remaining amount of fuel, and a similar specification of the outboard motor 3 in an analog format or a digital format by switching the display screen of the display unit 12 according to the information contents in the gauge mode.

The display device 10 further includes a multidimensional code creating unit 14, which converts information on an operation history and a past failure history of the outboard motor 3 and similar information in the multidimensional code and delivers the coded information contents to the display controller 13, a storage unit 15, which stores the operation history and the past failure history of the outboard motor 3 and similar information, a sensor signal input unit 16 to which output signals from various sensors described later are input, and a mode determining unit 17, which determines whether to set the display mode to the gauge mode or the service tool mode based on the signal input to the sensor signal input unit 16. The above-described respective units in the display device 10 are coupled to a control unit 18 to control these behaviors.

Here, as illustrating in FIG. 1, the boat 1 includes fuel tanks 19, which accumulate the fuel supplied to engines of the outboard motors 3. In this example, the two fuel tanks 19 are provided, fuel sensors 20 (see FIG. 2) detect the remaining amounts of the fuel of the respective fuel tanks 19, and detection signals of the fuel sensors 20 are input to the sensor signal input unit 16. A trim angle sensor 21 (see FIG. 2) detects angles of trim of the respective outboard motors 3, and detection signals of the trim angle sensor 21 are input to the sensor signal input unit 16.

Figure 4:
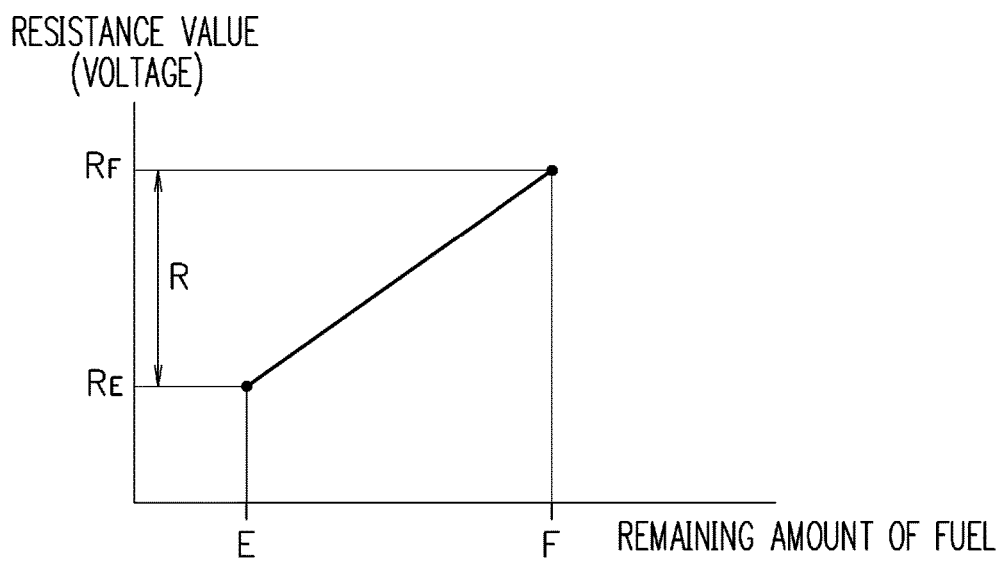
FIG. 4 is a graph illustrating a relationship between a remaining amount of fuel and a variable resistor of a fuel sensor of the outboard motor according to the present invention.

The display units 12 are configured so as to correspond to the fuel sensors 20, which output analog output signals of variable resistance values, and the trim angle sensor 21. The respective fuel sensors 20 are configured using variable resistors, and resistance values of the variable resistors change according to the remaining amounts of the fuel in the fuel tanks 19. For example, as illustrating in FIG. 4, the resistance values change between resistance values RE and RF corresponding to the remaining amounts of fuel 0 (EMPTY) to full (FULL). The resistance value of the variable resistor is converted into, for example, a voltage and is input to the sensor signal input unit 16. In the usual usage, the respective fuel sensors 20 output the analog output signals in a predetermined range corresponding to a variable range R of the variable resistors. The trim angle sensor 21 is also similarly configured using the variable resistor and the resistance value of the variable resistor changes according to the angle of trim of the outboard motor 3. In the case of the trim angle sensor 21 as well, in the usual usage, the trim angle sensor 21 outputs the analog output signals in the predetermined range corresponding to the variable range of the variable resistor and the analog output signal is input to the sensor signal input unit 16.

As illustrated in FIG. 1, the display device 10 with the configuration in the gauge mode is, for example, disposed at a predetermined position in the boat navigation room 4 and is coupled to the ECM 8 of the outboard motor 3 via the communication line 9. To power on the ECM 8 of the outboard motor 3, an ON operation of the ignition switch 7 in key panel 22 (see FIG. 2) that turns ON/OFF the power feeding from the battery 11 is required. The boat operator switches the screen in the display unit 12 of the display device 10 and can obtain the information on the engine speed, the running speed, the fuel consumption, and the remaining amount of fuel of the outboard motor 3, and similar information.

Figure 5:
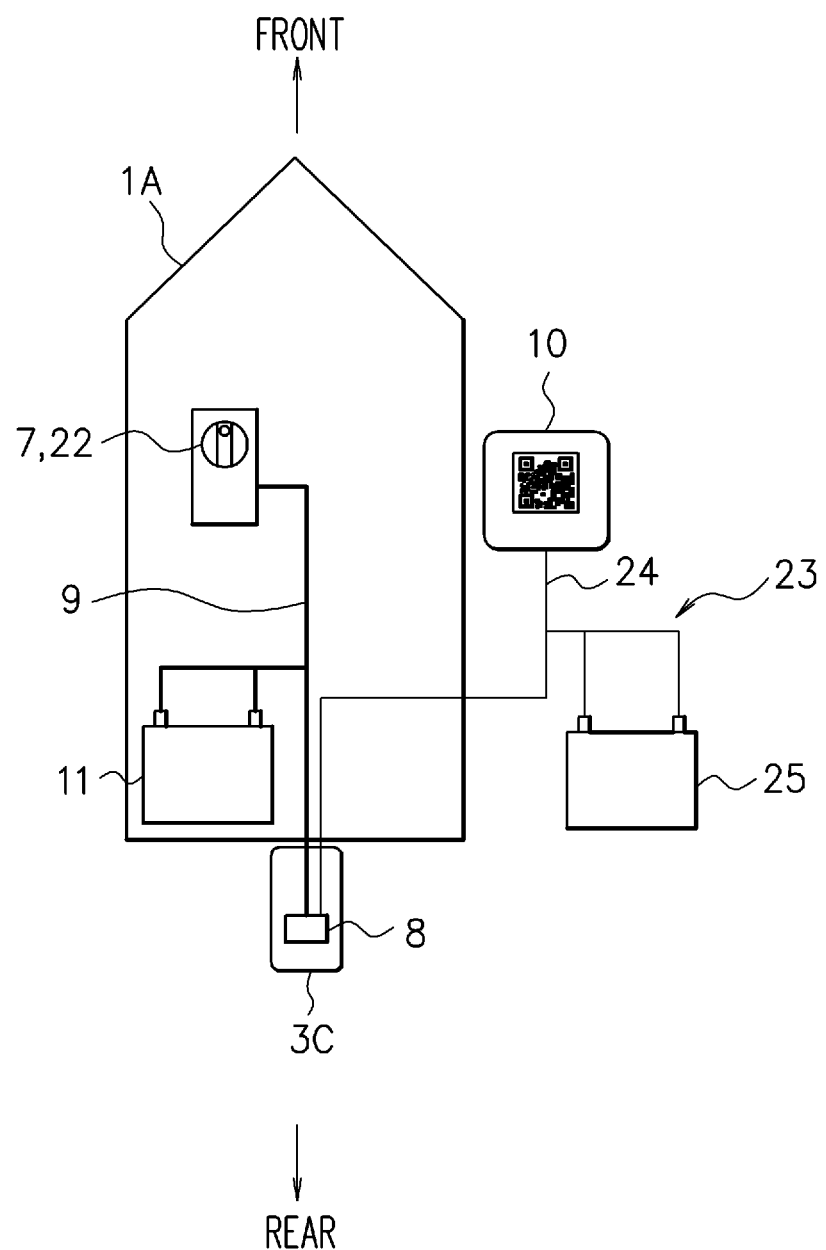
FIG. 5 is a diagram schematically illustrating a coupling relationship between the outboard motor and the display device and a similar member of the boat according to the embodiment of the present invention.

The following describes the case of the display device 10 in the service tool mode. For example, assume that an outboard motor 3C of a boat 1A, which does not include the display device 10 as illustrated in FIG. 5, has a failure around the boat 1 (see FIG. 2), which includes the outboard motors 3, at a remote location far from a maintenance factory or a similar site. FIG. 5 uses identical reference numerals to the members corresponding to the members in FIG. 2. First, the display device 10 is removed from the outboard motor 3 of the boat 1 and is coupled to the outboard motor 3C of the boat 1A. In this case, as illustrated in FIG. 5, a service kit 23 including a harness 24 for the service tool mode is used, and the display device 10 is coupled to the ECM 8 of the outboard motor 3C via the harness 24. The display device 10 is powered on by a battery 25 in the service kit 23, and the operation of a ignition switch 7 in key panel 22 powers on the ECM 8 of the outboard motor 3C by the battery 11 mounted to the boat 1A itself.

When the display device 10 is mounted to the boat 1, the storage unit 15 of the display device 10 itself once stores the information obtained from the ECM 8 in the outboard motor 3, and for communications between the display device 10 and the ECM 8 in the outboard motor 3C, the information on the outboard motor 3 is defaulted. Thus defaulting the information ensures preventing a disturbance or a similar failure of the information on the outboard motor 3 in communications between the display device 10 and the ECM 8 in the outboard motor 3C. When the display device 10 is coupled to the ECM 8 in the original outboard motor 3, the termination of the service tool mode is recognized by removal of the harness 24 from the display device 10. In view of this, the information on the outboard motor 3 is restored from the default state, making the usage of the display device 10 in the outboard motor 3 in the gauge mode possible again.

This embodiment automatically switches the gauge mode to the service tool mode of the display device 10. In this case, the harness 24 is configured such that the harness 24 loads the input signal in a region where the signal input to the sensor signal input unit 16 is absent while the boat 1 is in the usual usage state. Based on this input signal value, the gauge mode is automatically switched to the service tool mode. As described above, in the usual usage, the respective fuel sensors 20 output the analog output signals in the predetermined range corresponding to the variable range R of the variable resistors, and the analog output signals are input to the sensor signal input unit 16. The same applies to the trim angle sensor 21. Specifically, the resistance value that the harness 24 has is configured to be out of the variable range R of the variable resistors of the fuel sensors 20, that is, configured to be the resistance value RE or less or the resistance value RF or more, and the resistance value of this harness 24 is input to the sensor signal input unit 16. The mode determining unit 17 determines that the mode is the service tool mode based on the input signal value input from the harness 24 to the sensor signal input unit 16, and the control unit 18 controls the operation of the service tool mode.

After the transition to the service tool mode, the display device 10 obtains the information on the operation history and the past failure history of the outboard motor 3C and similar information from the ECM 8 in the outboard motor 3C. The multidimensional code creating unit 14 converts the obtained information on the operation history and the past failure history of the outboard motor 3C and similar information into the multidimensional code (multidimensional code information) and delivers the coded information contents to the display controller 13. The display controller 13 switches the screen in the display unit 12 of the display device 10 and causes the display unit 12 to display the multidimensional code information regarding the outboard motor 3C.

Further, multidimensional code information 26 obtained from the outboard motor 3C in FIG. 6 and displayed in the display unit 12 is photographed with a camera 101 in a mobile terminal 100 and is recorded in a memory 102 of the mobile terminal 100. A mobile terminal 104 or a personal computer 106 at the remote location such as the maintenance factory receives the multidimensional code information 26 by an e-mail 103 and a memory 105 in the mobile terminal 104 records the multidimensional code information 26. The multidimensional code information 26 recorded in the memory 105 is converted into characters and value data interpretable by a person by a conversion function of the mobile terminal 104 or the personal computer 106 for display. At the maintenance factory or a similar site, the information on the operation history and the past failure history of the outboard motor 3C and similar information electrically transmitted with the multidimensional code information 26 is analyzed, a failure diagnosis or a similar operation is performed, and the diagnostic result is transmitted from the mobile terminal 104 to the mobile terminal 100 by e-mail. At the mobile terminal 100 side that has received the diagnostic result, the outboard motor 3C is, for example, repaired based on the diagnostic result. Thus, a countermeasure against a failure is possible at the remote location such as the maintenance factory using the multidimensional code information 26 as the medium.

After the completion of repair, removing the harness 24 from the display device 10 terminates the service tool mode, and coupling the display device 10 to the ECM 8 of the original outboard motor 3 allows using the display device 10 in the gauge mode in the outboard motor 3.

In the above-described case, the mode determination between the gauge mode and the service tool mode is performed based on the input signal values from the plurality of sensors, that is, the fuel sensors 20 and/or the trim angle sensor 21. That is, the mode is switched to the service tool mode in the case where the input signals input from the plurality of sensors simultaneously are in a region other than the usual usage region.

For example, this corresponds to, for example, the cases where the input signals from the two fuel sensors 20 are both in the region other than the usual usage region or the input signals from the one fuel sensor 20 and the trim angle sensor 21 are both in the region other than the usual usage region. In this example, the mode is switched to the service tool mode in the case where the input signals from at least two sensors of the identical kind or different kinds among the fuel sensors 20 and the trim angle sensor 21 are in the region other than the usual usage region.

The display device 10 according to the present invention displays the information on the engine speed, the running speed, the fuel consumption, the remaining amount of fuel, and similar information of the outboard motor 3 in the gauge mode to achieve the original gauge function. This achieves the excellent functionality of the display device 10. Meanwhile, in addition to the original function, the display device 10 can be used as the service tool mode. In this case, providing the storage unit 15, which stores the information unique to the outboard motor 3, eliminates the need for the initial setting when the gauge mode is returned from the service tool mode, significantly excellent in the usability and a similar feature.

Automatically switching the gauge mode to the service tool mode based on the input signal value from the harness 24 using the service kit 23 eliminates the need for the switching operation from the gauge mode to the service tool mode. Accordingly, the boat operator is free from a burdensome of the mode switching operation. Further, forgetting the switching from the gauge mode to the service tool mode does not occur; therefore, the initial setting can be prevented from being overwritten during the use of the gauge mode.

Among the fuel sensors 20 and/or the trim angle sensor 21, when the input signals input from the plurality of sensors simultaneously are in the region other than the usual usage region, the mode is switched to the service tool mode. Therefore, due to any reason (for example, a failure and disconnection), even if the signal from one of the fuel sensors 20 and/or the trim angle sensor 21 becomes a value in the region other than the usual usage region, a malfunction such as sudden switching to the service tool mode during the use of the gauge mode can be avoided.

In the actual usage of the display device 10, some users of the outboard motor selectively mount the display device 10, that is, some users do not use the display device 10. For repair or a similar purpose, the users conventionally have gone to the actual place where the outboard motor has been located, and the users have coupled the personal computer to obtain the information. When the outboard motor having the failure is used at a remote location, just the movement requires extremely much time. Only attaching the display device 10 of the boat 1 to the boat 1A that does not include the display device 10 like this embodiment ensures quick handling for the repair of the faulty outboard motor 3C, providing a significant effect practically.

While the embodiment of the present invention is described in detail with reference to the drawings, the embodiment merely describes the concrete examples to embody the present invention. The technical scope of the present invention is not limited to the embodiment. The present invention can be variously modified within the scope of not departing from the gist and the modifications are included in the technical scope of the present invention.

For example, the display device 10 having the multidimensional code information may be coupled to the mobile terminal 100 by wired connection such that the mobile terminal 100 directly obtains the multidimensional code information from the display device 10.

According to the present invention, in addition to the original function of the display device, the display device can be used in the service tool mode. In this case, including the storage unit that stores the information unique to the outboard motor eliminates the need for an initial setting when the service tool mode is returned to the gauge mode, significantly excellent in the usability and a similar feature.

What is claimed is:

1. A display device for an outboard motor in which a multidimensional code representing an operating state of the outboard motor and unique information of the outboard motor is displayable, the display device for the outboard motor comprising:
    a storage device storing the unique information of the outboard motor, wherein:
        the display device for the outboard motor has a gauge mode and a service tool mode as display modes, by mounting the display device for the outboard motor to a specific boat, both the operating state of the outboard motor and the unique information of the outboard motor being displayable in the gauge mode, only the unique information of the outboard motor being displayable in the service tool mode, and the display modes are configured to be switched between the gauge mode and the service tool mode;
    a display unit configured to display information, the information including a remaining amount of fuel in a fuel tank mounted to the boat and an angle of trim of the outboard motor; and
    a sensor signal input unit configured to receive an output signal from a sensor to obtain the information, wherein:
        the display unit is configured to correspond to the sensor that outputs an analog output signal of a variable resistance value,
        a harness for the service tool mode is configured such that the harness for the service tool mode loads an input signal in a region where the signal input to the sensor signal input unit is absent while the boat is in a usual usage state, and
        the gauge mode is automatically switched to the service tool mode based on the input signal value.

2. A display device for the outboard motor in which a multidimensional code representing an operating state of the outboard motor and unique information of the outboard motor is displayable, the display device for the outboard motor comprising:
    a storage device storing the unique information of the outboard motor, wherein:
        the display device for the outboard motor has a gauge mode and a service tool mode as display modes, by mounting the display device for the outboard motor to a specific boat, both the operating state of the outboard motor and the unique information of the outboard motor being displayable in the gauge mode, only the unique information of the outboard motor being displayable in the service tool mode, and the display modes are configured to be switched between the gauge mode and the service tool mode;
    a display unit configured to display information, the information including a remaining amount of fuel in a fuel tank mounted to the boat and an angle of trim of the outboard motor; and
    a sensor signal input unit configured to receive an output signal from a sensor to obtain the information, wherein:
        the display unit is configured to correspond to the sensor that outputs an analog output signal of a variable resistance value,
        a harness for the service tool mode is configured such that the harness for the service tool mode loads an input signal in a region where the signal input to the sensor signal input unit is absent while the boat is in a usual usage state,
        the gauge mode is automatically switched to the service tool mode based on the input signal value,
    whether the mode is the gauge mode or the service tool mode is determined based on the input signal values from a plurality of the sensors, and
    when the input signals input from the plurality of sensors simultaneously are in a region other than the usual usage region, the mode is switched to the service tool mode.

* * * * *